United States Patent [19]

Harkrader et al.

[11] Patent Number: 5,146,805

[45] Date of Patent: Sep. 15, 1992

[54] BUSHING ASSEMBLY FOR A PIVOT CONNECTION

[75] Inventors: Ronald L. Harkrader, Clio; Thomas C. Zebehazy, Rochester Hills, both of Mich.

[73] Assignee: General Motors Corporation, Detroit, Mich.

[21] Appl. No.: 758,024

[22] Filed: Sep. 12, 1991

[51] Int. Cl.$^5$ .................. B60K 20/00; F16C 11/04; F16D 1/08; G05G 9/00

[52] U.S. Cl. .................. 74/473 SW; 16/342; 16/DIG. 6; 16/DIG. 36; 384/275; 384/295; 384/296; 403/120; 403/149; 403/158

[58] Field of Search .................. 403/120, 149, 158; 384/125, 275, 295, 296; 74/473 SW, 473 P, 490; 16/228, 337, 342, 273, DIG. 6, DIG. 27, DIG. 33, DIG. 36

[56] References Cited

U.S. PATENT DOCUMENTS

| | | | |
|---|---|---|---|
| 3,130,991 | 4/1964 | Piragino | 384/125 |
| 4,586,750 | 5/1986 | Vogel | 16/DIG. 6 |
| 4,678,349 | 7/1987 | Yoshigai | 384/125 |
| 4,733,573 | 3/1988 | Kramer | 74/473 SW |
| 4,913,562 | 4/1990 | Rosen | 384/296 |
| 4,951,349 | 8/1990 | Dietrich et al. | 16/342 |

FOREIGN PATENT DOCUMENTS

| | | | |
|---|---|---|---|
| 631133 | 11/1961 | Canada | 384/125 |
| 2404241 | 5/1979 | France | 16/228 |
| 56-49413 | 5/1981 | Japan | 384/295 |

Primary Examiner—John Sipos
Assistant Examiner—Donald M. Gurley
Attorney, Agent, or Firm—Donald F. Scherer

[57] ABSTRACT

A pivot mount for a vehicular shift lever which precludes the play in the shift lever. The mount is employed in conjunction with a shift bowl that is rotatably mounted on a steering column. A clevis extends radially outwardly from the shift bowl, and the clevis has laterally spaced connecting plates. A bore penetrates each connecting plate. The bores through the connecting plates are registered. A shift lever having a mounting block is mounted from the clevis. The mounting block has laterally spaced, substantially parallel, first and second faces adapted to be embraced between the connecting plates. An aperture penetrates the mounting block and opens through the first and second faces to register with the bores through the connecting plates. A bushing assembly having an annular body portion with longitudinally spaced first and second rim edges is insertably received within the aperture which penetrates the mounting block. A pivot pin extends through not only the bores in the connecting plates but also the aperture through the mounting block. A pair of longitudinally resilient arms extends transversely outwardly from the first rim edge and are canted such that the distal end portions thereof are displaced toward the second rim edge. A slot extends between the first and second rim edges. The slot opens through the first rim edge between the resilient arms. A recess in the first face extends radially outwardly from the aperture through the mounting block and is adapted to receive the resilient arms.

3 Claims, 2 Drawing Sheets

BUSHING ASSEMBLY FOR A PIVOT CONNECTION

TECHNICAL FIELD

The present invention relates generally to pivot connections. More particularly, the present invention relates to an improved bushing assembly adapted for use in conjunction with a pivot connection. Specifically, the present invention relates to an improved bushing assembly that is particularly adapted for use to eliminate undesirable play in the pivot connection of a vehicular shift lever.

BACKGROUND OF THE INVENTION

As is well known, mechanical linkages inherently, and to some extent desirably, include at least a modicum of play. However, in order to assure relatively low play, manufacturers customarily utilize rather small tolerances, but such an approach can be quite costly and can result in excessively tight fits. In an environment where there is an interface between an operator and the linkage involved, an overly tight, or an overly loose fit may not produce a pleasing tactile feedback to the operator.

Another approach has been to interpose a bushing member in conjunction with any joints in the linkage, and particularly so when a radial dimension is to be accommodated. For accommodating axial tolerances, such items as Belleville springs, have been employed in an effort to provide an axial bias to overcome excessive play in such an arrangement. However, such mechanical devices, and particularly those relating to axial bias, have not been totally successful in view of the limited surface contact normally available for the biasing reaction required for that type movement.

Little, if any, effort has been expended to effect a simultaneous reduction in both radial and axial play. The present invention does, however, address that problem by the use of a unique bushing assembly in a pivotal connection.

SUMMARY OF THE INVENTION

It is therefore a primary object of the present invention to provide a pivotal connection by which to eliminate the play, and particularly, the attendant rattles between a support member and a movable member pivotally mounted on the support member in order to impart a tactile sense of security and firmness to the connection.

It is another object of the present invention to provide a connection, as above, wherein a means is interposed between the support and movable members to effect a biasing action which acts axially with respect to the pivot pin upon which the movable member is mounted.

It is a further object of the present invention to provide a connection, as above, wherein the biasing means is incorporated in a bushing assembly having a sleeve portion that is adapted to be interposed between the pivot pin and the movable member, which sleeve portion obviates the need for close tolerances in the manufacture of the mounting assembly.

It is still another object of the present invention to provide a connection, as above, wherein the sleeve portion of the bushing assembly provides maximum axial contact between the pivot pin and the movable member supported thereon in order to eliminate cocking.

These and other objects of invention, as well as the advantages thereof over existing and prior art forms, which will be apparent in view of the following detailed specification, are accomplished by means hereinafter described and claimed.

In general, the present invention is particularly adapted for use in a mount for pivotally supporting a movable member in the nature of a lever. A mount embodying the concepts of the present invention precludes slop or play in the pivotal connection, and the mount utilizes a unique bushing assembly which cooperatively interacts with the connecting plates of a clevis from which the lever is pivotally mounted. The bushing assembly has a substantially annular sleeve-like body portion with longitudinally spaced first and second rim edges. A pair of arms extend transversely outwardly from the first rim edge.

Means are also provided to impart longitudinal resilience to the arms. A slot extends between the first and second rim edges, and the slot opens through the first rim edge between the arms. The arms each have a proximal and a distal end portion, and the proximal portion of each arm is secured to the first rim edge of the body portion. The arms are cantilevered transversely outwardly from the distal end portion, and each said arm is also longitudinally canted such that the distal end portion is longitudinally displaced toward the second rim edge. This canted disposition effects relative axial biasing between the movable member and the support member such as to preclude play therebetween.

The present pivotal mount, and the unique bushing assembly incorporated therein, is described in conjunction with one exemplary embodiment thereof which is deemed sufficient to effect a full disclosure of the subject invention. The exemplary mount, and the bushing assembly employed therein, is described in detail without attempting to show all of the various forms and modifications in which the invention might be embodied; the invention being measured by the appended claims and not by the details of the specification.

DESCRIPTION OF AN EXEMPLARY EMBODIMENT

Figure 1:
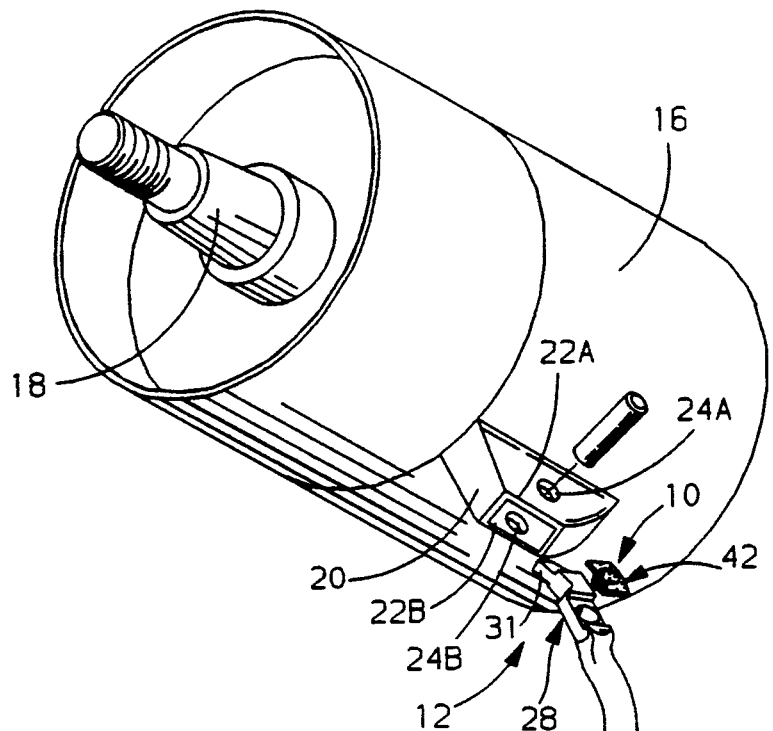
FIG. 1 is a perspective view of a shift bowl mounted on a vehicular steering column that is adapted to receive a shift lever by a pivot connection which incorporates a bushing assembly embodying the concepts of the present invention.
Figure 3:
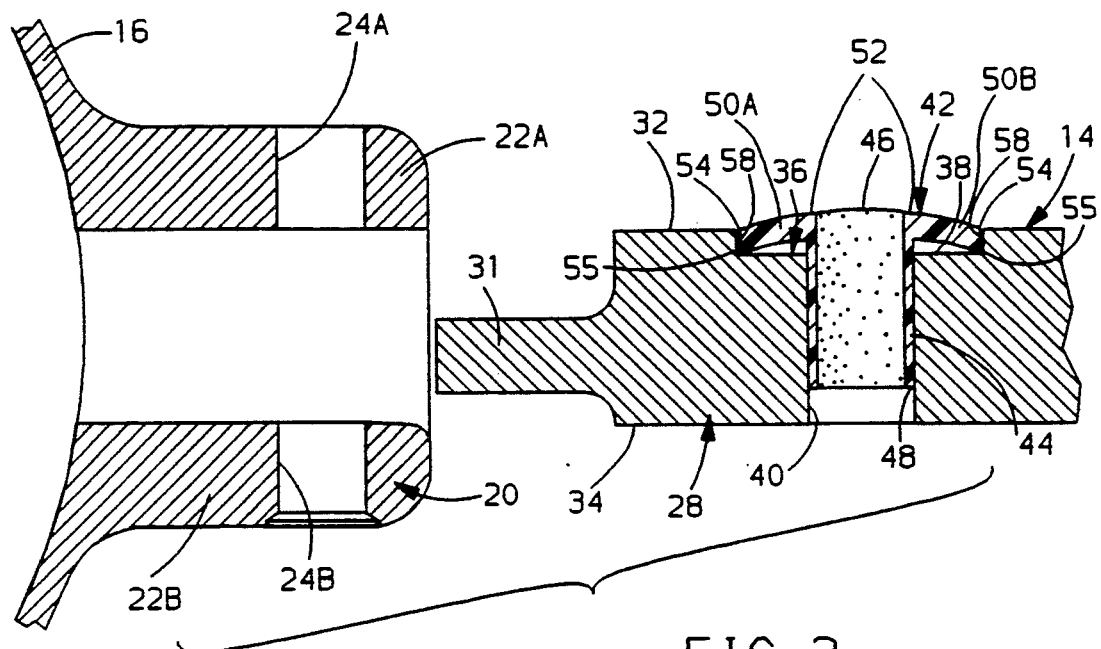
FIG. 3 is a transverse section through a clevis connection presented from the shift bowl, as shown in FIG. 1, and into which the mounting block of a shift lever is poised to be received, the bushing assembly depicted as being received within the mounting block and with the distal end portion of each arm engaging the reaction surface in a recess in the mounting block prior to the time that the mounting block is embracingly received within the clevis.

One representative form of a bushing assembly embodying the concepts of the present invention is designated generally by the numeral 10 on the accompanying drawings. The representative bushing assembly 10 may be employed in a pivot connection 12 (FIG. 1) by which a movable member in the nature of a shift lever 14 is operatively secured to a support member in the nature of a shift bowl 16 which is itself mounted on a vehicular steering column 18. With reference to FIG. 3, the support member includes a clevis 20, which is comprised of laterally spaced substantially parallel connecting plates 22, each of which is penetrated by a bore 24. That is, the plates 22A and 22B are penetrated, respectively, by bores 24A and 24B.

As previewed in the previous paragraph, and as will be employed in the detailed description which follows, a particular structural member, component or arrangement may be employed at more than one location. When referring generally to that type of structural member, component or arrangement, a common numerical designation shall be employed. However, when one of the structural members, components or arrangements so identified is to be individually identified, it shall be referenced by virtue of a letter suffix employed in combination with the numerical designation employed for general identification of that structural member, component or arrangement. Thus, there are at least two connecting plates which are generally identified by the numeral 22, but the specific individual connecting plates are, therefore, identified as 22A and 22B in the specification and on the drawings. The bores 24A and 24B which penetrate the respective connecting plates 22A and 22B are similarly designated. This same suffix convention shall be employed throughout the specification.

The shift lever 14 is mounted for pivotal movement on the clevis 20. The shift lever 14 has a mounting block 28 (FIG. 2) of generally rectilinear cross section with a handle portion 30 extending outwardly from one end of the mounting block 28 and with a shift dog 31 extending outwardly from the other end of the mounting block 28. The shift dog 31 may interact with a shift gate (not shown) in the customary fashion.

With particular emphasis on the mounting block 28, it presents opposed faces 32 and 34 which are embracingly received between the connecting plates 22A and 22B. The face 32 is recessed, as at 36, to present a reaction surface 38, the purpose of which will be hereinafter more fully described In any event, the reaction surface 38 is disposed in opposition to the plate 22A, and the face 34 is disposed in contiguous juxtaposition to plate 22B. The mounting block 28 is provided with an aperture 40 which opens through face 34, as well as the reaction surface 38 in the recess 36. When the mounting block 28 is embracingly received between the connecting plates 22A and 22B of the clevis 20, the aperture 40 registers with the bores 24A and 24B which are, therefore, registered with each other.

The representative bushing assembly embodying the concepts of the present invention is designated by the numeral 42, and the bushing has an annular body or sleeve portion 44, the length of which is delineated by first and second rim edges 46 and 48. A pair of oppositely directed arms 50A and 50B extend diametrically outwardly from the first rim edge 46. As such, the proximal end portion 52 of each arm may be integrally connected to the first rim edge 46. The distal end portion 54 of each arm 50 is not, however, coplanar with the proximal end portion 52 thereof. Rather, the distal end portions 54 of the arms 50 are longitudinally offset toward the second rim edge 48 of the body portion 44.

Figure 2:
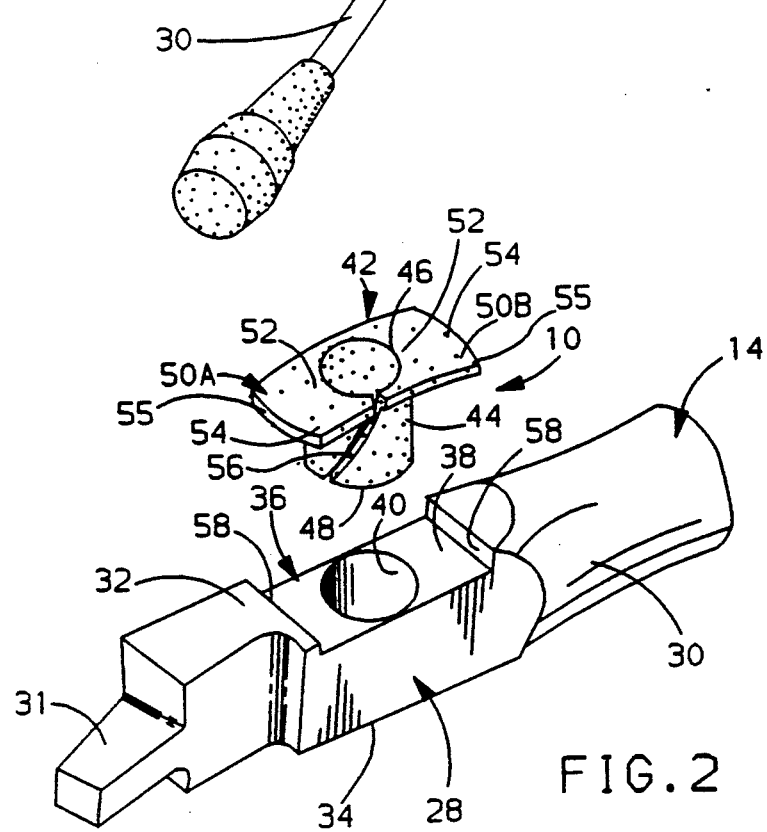
FIG. 2 is an enlarged exploded perspective view of a mounting block presented from the shift lever and a bushing assembly embodying the concepts of the present invention which interacts with the mounting block.

This disposition of the distal end portion 54 on each arm 50 relative to the proximal end portion 52 causes each arm 50 to splay or cant longitudinally with respect to the body portion 44. This pendent mounting of the arms 50 with respect to the first rim edge 46 effects the desired resilience to the arms 50, particularly when the bushing assembly 10 is made of an appropriate material. The outer edge 55 of the distal end portion 54 of each arm 50 is also preferably curvilinear. As best seen in FIG. 2, the curvilinear disposition constitutes an arc of relatively long radius.

The body or sleeve portion 44 is also annularly discontinuous. That is, the body portion has a slot 56 which extends substantially longitudinally along the entire length of the body portion 44 and thus penetrates both the first and second rim edges 46 and 48. As shown, the slot 56 is preferably helical and penetrates the first rim edge 46 orthogonally with respect to the arms 50A and 50B which extend diametrically outwardly from the first rim edge 46.

The annularly discontinuous body portion 44 is receivable within the aperture 40 which penetrates the mounting block 28, and the helical slot 56 permits the body portion to be adaptably receivable within the aperture 40 without the necessity of any close tolerance in the diameter or location of the aperture 40. When the body portion 44 is received within the aperture 40, the distal end portion 54 on each arm 50 engages the reaction surface 38 within the recess 36, as represented in FIG. 3, and thus requires that the resiliency of the arms 50 be overcome before the body portion 44 can be fully inserted within the aperture 40. By having the distal end portions 54 of each arm arcuately rounded in a transverse plane, the end portions 54 will not be subject to possible interference with the end walls 58 of the recess 36.

The bushing assembly 10 may well comprise a thermoplastic resin. Such resins are preferably reinforced with fibers, such as fiber glass,, graphite, Kevlar or the like, and provide a material commonly referred to as a fiber-reinforced plastic (FRP). While a variety of thermoplastic materials and fiber reinforcements are known, one particularly suitable FRP comprises vinyl chloride resins reinforced with glass fibers.

The amount of fiber reinforcement in such a product can range broadly from about five to fifty percent (5% to 50%) by weight, based upon the combined weight of glass fibers and vinyl chloride resin, desirably from about ten to forth percent (10% to 40%) by weight; preferably about fifteen to thirty-five percent (15% to 35%) by weight; and most preferably is about thirty percent (30%) by weight.

Figure 4:
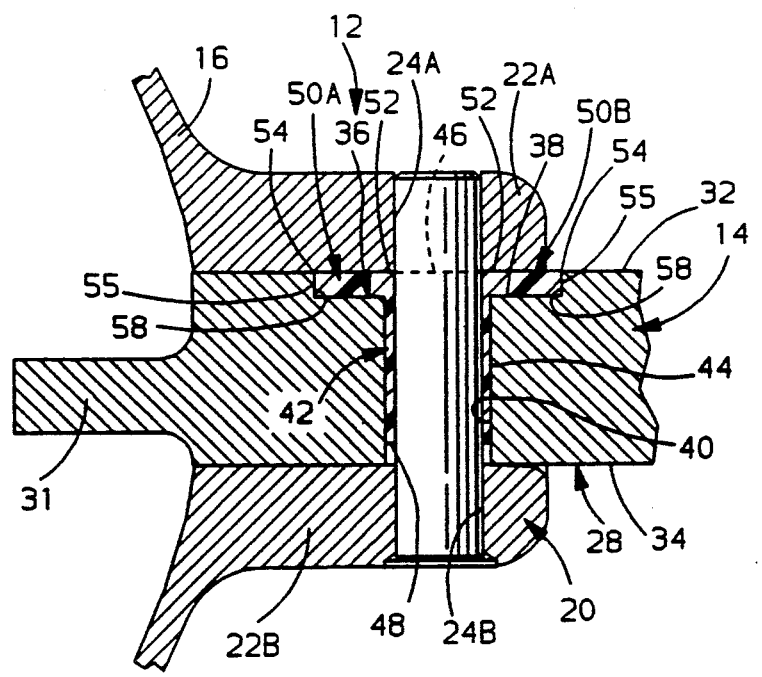
FIG. 4 is a view similar to FIG. 3, but with the components assembled to show the bushing assembly in side elevation with the arms thereon flexed to effect a biasing reaction between the mounting block and the clevis.

In any event, when the mounting block 28 is embracingly received between the connecting plates 22 of the clevis 20, as shown in FIG. 4, the resiliency of the arms 50 tend to drive the body portion 44 outwardly of the aperture 40 and against the connecting plate 22A. The equal and opposite reaction to the resiliency of the arms 50 causes the face 34 of the mounting block 28 to be driven firmly against the connecting plate 22B, thus obviating any play that otherwise might exist therebetween.

As should now be apparent, the present invention not only teaches that a pivot connection embodying the concepts of the present invention precludes play in the connection but also that the other objects of the invention can likewise be accomplished.

The embodiments of the invention in which an exclusive property or privilege is claimed are defined as follows:

1. A pivot mount for a vehicular shift lever which precludes the play in said shift lever, said mount comprising: a shift bowl rotatably mounted on a steering column; a clevis extending radially outwardly from said shift bowl, said clevis having laterally spaced connecting plates; a bore penetrating each said connecting plate; said bores through said connecting plates being registered; a shift lever; said shift lever having a mounting block; said mounting block having laterally spaced, substantially parallel first and second faces disposed between said connecting plates; an aperture penetrating said mounting block and opening through said first and second faces to register with the bores through said connecting plates; a bushing assembly having an annular body portion with longitudinally spaced first and second rim edges; said body portion received within said aperture penetrating said mounting block; a pivot pin extending through said bores in said connecting plates and the aperture through said mounting block; a pair of longitudinally resilient arms extending transversely outwardly from said first rim edge; a slot extending between said first and second rim edges; said slot opening through said first rim edge between said resilient arms; a recess in said first face extending radially outwardly from said aperture through said mounting block and receiving said resilient arms.

2. A pivot mount for a shift lever, as set forth in claim 1 wherein: said arms each have a proximal and a distal end portion; said proximal portion of each arm is secured to the first rim edge of said body portion; said arms are cantilevered transversely outwardly from said proximal end portion and each said arm is also longitudinally canted such that said distal end portion is longitudinally displaced toward said second rim edge in order to impart resilience to each said arm.

3. A pivot mount for a shift lever as set forth in claim 2 wherein: said arms extend transversely outwardly from said first rim edge in diametric opposition; said slot opens through said first rim edge in orthogonal relation to said arms; and, said slot extends helically from said first rim edge to said second rim edge.

* * * * *